(12) United States Patent
Hino

(10) Patent No.: US 7,992,413 B2
(45) Date of Patent: Aug. 9, 2011

(54) PROCESS FOR PRODUCING SYNTHETIC QUARTZ GLASS

(75) Inventor: Keigo Hino, Koriyama (JP)

(73) Assignee: Asahi Glass Company, Limited, Tokyo (JP)

( * ) Notice: Subject to any disclaimer, the term of this patent is extended or adjusted under 35 U.S.C. 154(b) by 704 days.

(21) Appl. No.: 11/839,871

(22) Filed: Aug. 16, 2007

(65) Prior Publication Data

US 2007/0289331 A1   Dec. 20, 2007

Related U.S. Application Data

(63) Continuation of application No. PCT/JP2006/303334, filed on Feb. 17, 2006.

(30) Foreign Application Priority Data

Feb. 18, 2005   (JP) ................................. 2005-042516

(51) Int. Cl.
   *C03B 37/018*   (2006.01)
(52) U.S. Cl. ............... 65/416; 65/414; 65/385; 65/17.2; 65/17.6
(58) Field of Classification Search .......... 65/17.2–17.6, 65/385, 395, 414, 416, 440
   See application file for complete search history.

(56) References Cited

U.S. PATENT DOCUMENTS

| 5,719,698 A | 2/1998 | Hiraiwa et al. |
| 2003/0061833 A1 | 4/2003 | Menzel et al. |

FOREIGN PATENT DOCUMENTS

| EP | 1 103 528 A2 | | 5/2001 |
| JP | 61-83638 | | 4/1986 |
| JP | 61083638 | * | 4/1986 |
| JP | 62-72536 | | 4/1987 |
| JP | 62072536 | * | 4/1987 |
| JP | 64-28240 | | 1/1989 |
| JP | 11-1331 | | 1/1999 |

OTHER PUBLICATIONS

U.S. Appl. No. 11/853,891, filed Sep. 12, 2007, Hino.

* cited by examiner

*Primary Examiner* — Matthew J Daniels
*Assistant Examiner* — Jodi Cohen
(74) *Attorney, Agent, or Firm* — Oblon, Spivak, McClelland, Maier & Neustadt, L.L.P.

(57) ABSTRACT

An object of the invention is to provide a process for producing a synthetic quartz glass while taking account of a refractive index distribution remaining in the synthetic quartz glass; a jig for use in the synthetic-quartz-glass production process; and a synthetic quartz glass for an optical member, produced by the process. A process for producing a synthetic quartz glass, which comprises: depositing and growing fine quartz glass particles synthesized by flame hydrolysis of a glass-forming material on a rotating target to thereby form a porous quartz glass base of a substantially cylindrical shape; presintering the porous quartz glass base; and heating the presintered porous quartz glass base to a temperature not lower than the vitrification temperature to convert the base into a transparent glass, wherein in the step of conversion into a transparent glass, the porous quartz glass base is placed so as to make its growth axis vertical and a load is vertically imposed on the thus-placed porous quartz glass base.

2 Claims, 2 Drawing Sheets

US 7,992,413 B2

PROCESS FOR PRODUCING SYNTHETIC QUARTZ GLASS

TECHNICAL FIELD

The present invention relates to a process for producing a synthetic quartz glass, a jig for synthetic-quartz-glass production which is for use in the process, and a synthetic quartz glass for an optical member produced by the process.

BACKGROUND ART

Known processes heretofore in use for producing a synthetic quartz glass for, e.g., an optical member such as a mirror or lens include a process which comprises forming a porous quartz glass base by a vapor-phase reaction method and heating this base to convert it into a transparent glass (see, for example, patent document 1).

In the process for synthetic-quartz-glass production disclosed in patent document 1, a porous quartz glass base of a substantially cylindrical shape is formed by the so-called VAD (vapor-phase axial deposition) method in which a silicon compound, e.g., silicon tetrachloride, is introduced into an oxyhydrogen flame to synthesize fine quartz glass particles through flame hydrolysis and the fine quartz glass particles are deposited on a rotating target. In the process, this base is heated to a temperature not lower than the vitrification temperature to convert the base into a transparent glass.

The synthetic quartz glass thus obtained contains hydroxyl groups (OH groups) typically in an amount of about 100 to 300 ppm because of the nature of the process. It is known that the distribution of concentration of these OH groups can be a factor which causes a refractive index distribution in the synthetic quartz glass. Various techniques for diminishing this refractive index distribution have been proposed (see, for example, patent document 2).

In the process for producing a synthetic quartz glass disclosed in patent document 2, an operation in which a synthetic quartz glass is heated to a temperature not lower than the softening point to cause the glass to undergo self-weight deformation is repeatedly conducted while changing the direction of the self-weight deformation for each operation to thereby diminish the refractive index distribution in the synthetic quartz glass.

Patent Document 1: JP-A-62-72536
Patent Document 2: JP-A-64-28240

However, it is difficult to completely eliminate the refractive index distribution in a synthetic quartz glass even by, e.g., the process for producing a synthetic quartz glass disclosed in patent document 2. A further measure against the refractive index distribution remaining in a synthetic quartz glass has been necessary.

DISCLOSURE OF THE INVENTION

The invention has been achieved in view of the circumstances described above.

An object of the invention is to provide a process for producing a synthetic quartz glass while taking account of a refractive index distribution remaining in the synthetic quartz glass.

Another object is to provide a jig for synthetic-quartz-glass production which is for use in the process.

A still other object is to provide a synthetic quartz glass for an optical member produced by the process.

For accomplishing those objects, the process of the invention for producing a synthetic quartz glass comprises:

depositing and growing fine quartz glass particles synthesized by flame hydrolysis of a glass-forming material on a rotating target to thereby form a porous quartz glass base of a substantially cylindrical shape;

presintering the porous quartz glass base; and heating the presintered porous quartz glass base to a temperature not lower than the vitrification temperature to convert the base into a transparent glass, wherein in the step of conversion into a transparent glass, the porous quartz glass base is placed so as to make its growth axis vertical and a load, which is preferably from 0.4 to 20.0 $g/cm^2$, is vertically imposed on the thus-placed porous quartz glass base.

In a porous quartz glass base of a substantially cylindrical shape formed by depositing, on a rotating target, fine quartz glass particles synthesized by the flame hydrolysis of a glass-forming material as in the process described above, a section thereof perpendicular to its growth axis has a convex type OH group concentration distribution curve in which the OH group concentration around the axis is relatively high and the distribution is substantially rotationally symmetric. Also in the synthetic quartz glass formed from this porous quartz glass base, the OH group concentration distribution and the refractive index distribution attributable thereto retain rotational symmetry. By designing/producing an optical member while taking account of the rotational symmetry, the optical properties of the optical member produced from the synthetic quartz glass can be improved.

Consequently, when a porous quartz glass base is converted to a transparent glass in the process for producing a synthetic quartz glass described above, the porous quartz glass base is placed so as to make its growth axis vertical and a load is vertically imposed on the thus-placed porous quartz glass base. The reasons for this are as follows. Although heating a porous quartz glass base to a temperature not lower than the vitrification temperature results in volumetric contraction, radial volumetric contraction can be allowed to proceed uniformly by holding the axis of the porous quartz glass base vertical. In addition, by vertically imposing a load on this porous quartz glass base, axial volumetric contraction can be allowed to proceed uniformly (in other words, the phenomenon in which axial volumetric contraction occurs nonuniformly to cause troubles such as base bending is avoided). Thus, also in the synthetic quartz glass formed from this porous quartz glass base, the OH group concentration distribution and the refractive index distribution attributable thereto can retain rotational symmetry.

The jig for synthetic-quartz-glass production of the invention is a jig for synthetic-quartz-glass production which is for use in the process for producing a synthetic quartz glass described above for vertically imposing a load on a porous quartz glass base and which is preferably made of carbon or SiC. This jig comprises: a base table on which the porous quartz glass base is to be placed while keeping the axis of the porous quartz glass base vertical; one or more guide members vertically disposed on the base table; and a pushing member supported by the guide members so as to be freely movable in the vertical direction and to sandwich the porous quartz glass base between the pushing member and the base table, wherein the pushing member vertically descends, while contacting the porous quartz glass base, accompanied with the contraction of the porous quartz glass base heated to a temperature not lower than the vitrification temperature, to thereby vertically impose a load on the porous quartz glass base by the weight of the pushing member itself.

According to the jig for synthetic-quartz-glass production described above, an optimal load can be imposed on the porous quartz glass base by a simple structure without inhibiting the contraction of the porous quartz glass base.

Consequently, the volumetric contraction of the porous quartz glass base can be allowed to proceed uniformly. Also in the synthetic quartz glass formed from this porous quartz glass base, the OH group concentration distribution and the refractive index distribution attributable thereto can retain the rotational symmetry.

According to the process for producing a synthetic quartz glass and jig for synthetic-quartz-glass production of the invention, the synthetic quartz glass can retain the rotational symmetry of refractive index distribution, and the optical member produced from this synthetic quartz glass while taking account of that rotational symmetry can have improved optical properties.

Figure 1A:
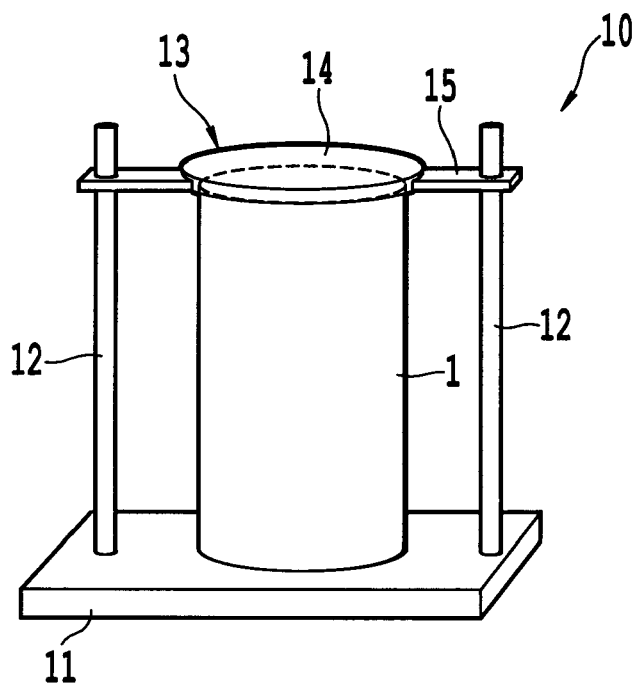
FIGS. 1 (A) and (B) are slant views illustrating one embodiment of the jig for synthetic-quartz-glass production according to the invention.

The reference numerals used in the drawings denote the followings, respectively.

1: Porous quartz glass base
10: Jig for synthetic-quartz-glass production
11: Base table
12: Guide member
13: Pushing member

BEST MODE FOR CARRYING OUT THE INVENTION

Figure 1B:
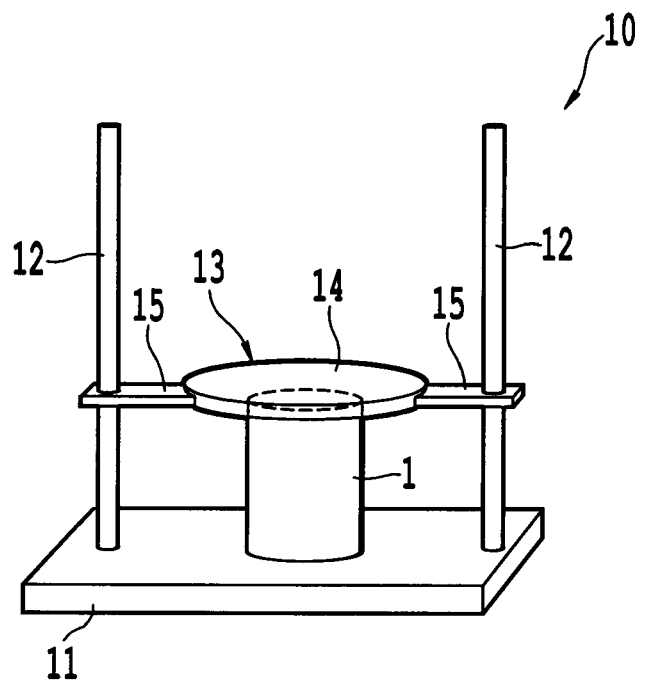

One embodiment of the process of the invention for producing a synthetic quartz glass and the jig of the invention for producing a synthetic quartz glass is explained below in detail. FIG. 1 are slant views illustrating one embodiment of the jig for synthetic-quartz-glass production according to the invention.

This embodiment comprises subjecting a glass-forming material to flame hydrolysis to synthesize fine quartz glass particles, depositing/growing the fine quartz glass particles on a target which is rotating to thereby form a porous quartz glass base of a substantially cylindrical shape, presintering the obtained porous quartz glass base, and heating the presintered porous quartz glass base to a temperature not lower than the vitrification temperature to convert the base into a transparent glass and thereby obtain a synthetic quartz glass. When the porous quartz glass base is converted to a transparent glass, the axis of the porous quartz glass base is held vertical and a load is vertically imposed on this porous quartz glass base. Thus, also in the synthetic quartz glass, the OH group concentration distribution and the refractive index distribution attributable thereto have intact rotational symmetry.

The glass-forming material is not particularly limited as long as it can be gasified. However, silicon halide compounds such as chlorides, e.g., $SiCl_4$, $SiHCl_3$, $SiH_2Cl_2$, and $Si(CH_3)Cl_3$, fluorides, e.g., $SiF_4$, $SiHF_3$, and $SiH_2F_2$, bromides, e.g., $SiBr_4$ and $SiHBr_3$, and iodides, e.g., $SiI_4$, are preferred from the standpoints of workability and cost.

The porous quartz glass base is formed by introducing any of those glass-forming materials into an oxyhydrogen flame to hydrolyze it and depositing the thus synthesized fine quartz glass particles on a rotating target. Examples of methods for depositing the fine quartz glass particles on a target include (1) the so-called OVD method in which while a core glass rod as the target is being rotated in the flame of a burner which is moving forward and backward in the axial direction of the core glass rod, the fine quartz glass particles are deposited on the outer surface of the core glass rod; (2) the so-called MCVD method in which while a glass pipe as the target is being rotated in the flame of a burner which is moving forward and backward in the axial direction of the glass pipe, the fine quartz glass particles are deposited on the inner surface of the glass pipe; and (3) the so-called VAD method in which while a rotating core glass rod is being pulled up in its axial direction, the fine quartz glass particles are deposited on the core glass rod so that the deposit grows from the end of the rod toward the axial direction as in the formation of an icicle. The rotation speed of the target is typically in the range of 0.1 to 10 rpm although it varies depending on the rate of deposition of the fine quartz glass particles.

In the substantially cylindrical, porous quartz glass base thus formed, a section thereof perpendicular to the axis has a convex type OH group concentration distribution curve in which the OH group concentration around the axis is relatively high and the distribution is substantially rotationally symmetric.

The obtained porous quartz glass base is relatively brittle and is hence presintered to impart thereto rigidity sufficient for handling. The presintering is typically accomplished by heating the base in the atmosphere at around 1,350° C. for several hours.

Subsequently, the presintered porous quartz glass base is heated to a temperature not lower than the vitrification temperature and thereby converted to a transparent glass. This conversion into a transparent glass may be accomplished by heating the porous quartz glass base at 1,400 to 1,550° C. for 1 hour or more. In this operation, the porous quartz glass base is heated while its growth axis is kept vertical and a load is being vertically imposed thereon.

Specifically, as shown in FIG. 1 (A), use is made of a jig 10 which comprises: a base table 11 on which the presintered porous quartz glass base 1 is to be placed while keeping the axis of the porous quartz glass base 1 vertical; guide members 12 vertically disposed on the base table 11; and a pushing member 13 supported by the guide members 12 so as to be freely movable in the vertical direction and to sandwich the porous quartz glass base 1 between the pushing member 13 and the base table 11. The jig 10 is made of a material having heat resistance, such as, e.g., carbon or SiC.

The guide members 12 are a pair of cylindrical rods vertically disposed so as to be located on both sides of the porous quartz glass base 1 placed on the base table 11. The pushing member 13 comprises: a substantially disk-shaped contact part 14 which comes into contact with an axial-direction end face of the porous quartz glass base 1 placed on the base table 1 with its axis vertical; and a guided part 15 having insertion holes into which the guide members 12 are to be inserted.

The guide members 12 have been inserted into the insertion holes of the guided part 15, and the guided part 15 slides along the guide members 12. Thus, the pushing member 13 is in the state of being freely movable in the vertical direction. As shown in FIG. 1 (B), as the porous quartz glass base 1 heated to a temperature not lower than the vitrification temperature undergoes volumetric contraction, the pushing member 13 descends vertically. Accordingly, a load is vertically imposed on the porous quartz glass base 1 by the weight of the pushing member 13 itself.

The load to be imposed on the porous quartz glass base 1 preferably is 0.4 to 20.0 g/cm$^2$. By regulating the load so as to be within that range, the volumetric contraction of the porous quartz glass base 1 can be allowed to proceed uniformly while preventing the load from generating a strain in the porous quartz glass base. In addition, also in the synthetic quartz glass obtained by converting the base into a transparent glass, the OH group concentration distribution and the refractive index distribution attributable thereto can have intact rotational symmetry.

For the purpose of preventing the pushing member 13, which descends with the volumetric contraction of the porous quartz glass base 1, from inclining, it is preferred that the insertion holes to be formed in the guided part 15 should be ones whose length dimension along the guide members 12 is relatively long.

EXAMPLES

In order to ascertain the effects of the invention, glasses were produced and examined in the following manners. A synthetic quartz glass of Example was produced according to the process for producing a synthetic quartz glass described above in which in the conversion into a transparent glass, the axis of the base was held vertical and a load was vertically imposed on this base. A synthetic quartz glass of Comparative Example was produced according to the process for producing a synthetic quartz glass described above in which in the conversion into a transparent glass, the axis of the base was held horizontal and no load was imposed on this base. These glasses were examined for refractive index distribution in a section thereof perpendicular to the axis.

In each of Example and Comparative Example, the porous quartz glass base was presintered by heating at 1,350° C. in the atmosphere for about 4 hours. Next, the porous quartz glass base presintered was held at 1,250° C. for 48 hours, subsequently heated to 1,450° C., and then held for 2 hours. Thereafter, the heater was switched off. Thus, vitrification was conducted.

Figure 2:
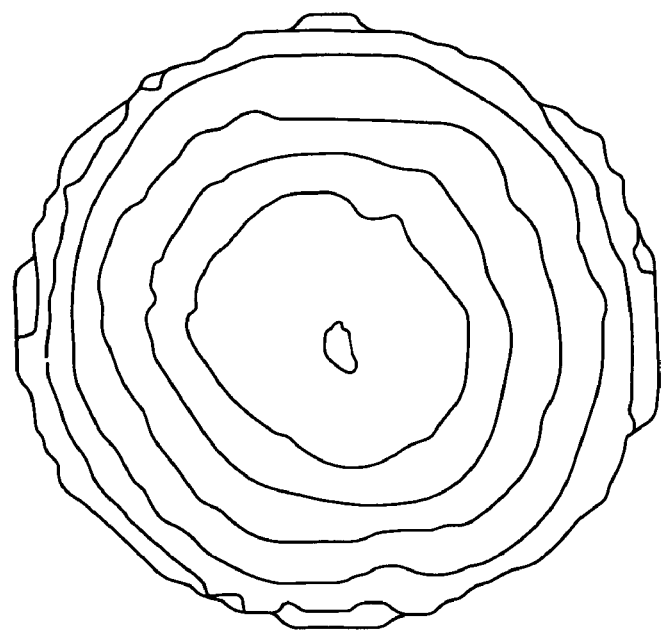
FIG. 2 shows a refractive index distribution in a section of a synthetic quartz glass obtained by converting a base into a transparent glass while holding the axis of the base vertical and vertically imposing a load thereon, the section being perpendicular to the axis.
Figure 3:
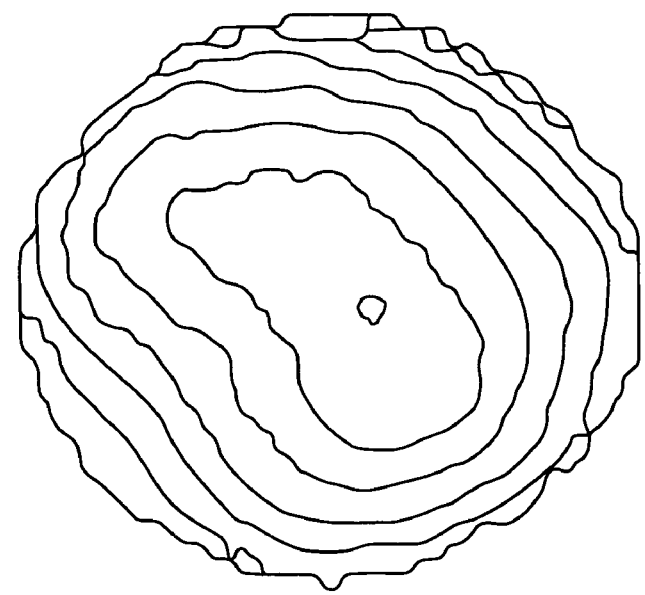
FIG. 3 shows a refractive index distribution in a section of a synthetic quartz glass obtained by converting a base into a transparent glass while holding the axis of the base horizontal and imposing no load thereon, the section being perpendicular to the axis.

The results of the examination of refractive index distribution in Example and Comparative Example are shown in FIGS. 2 and 3, respectively. The isograms in FIG. 3, which indicate a refractive index distribution in the synthetic quartz glass of Comparative Example, are flatter than the isograms in FIG. 2, which indicate a refractive index distribution in the synthetic quartz glass of Example. Compared to the synthetic quartz glass of Comparative Example, the synthetic quartz glass of Example retained the symmetry of refractive index distribution and was hence a material suitable for an optical member.

As explained above in detail, the process for producing a synthetic quartz glass according to the invention brings about the following effects. When a porous quartz glass base is heated to a temperature not lower than the vitrification temperature and thereby undergoes volumetric contraction, radial volumetric contraction can be allowed to proceed uniformly by holding the axis of the porous quartz glass base vertical. In addition, by vertically imposing a load on this porous quartz glass base, axial volumetric contraction can be allowed to proceed uniformly. Thus, also in the synthetic quartz glass formed from this porous quartz glass base, the OH group concentration distribution and the refractive index distribution attributable thereto can retain rotational symmetry.

According to the jig 10 for synthetic-quartz-glass production of the invention, an optimal load can be imposed on the porous quartz glass base by a simple structure without inhibiting the contraction of the porous quartz glass base. Consequently, the volumetric contraction of the porous quartz glass base can be allowed to proceed uniformly. Also in the synthetic quartz glass formed from this porous quartz glass base, the OH group concentration distribution and the refractive index distribution attributable thereto can retain rotational symmetry.

Furthermore, by designing/producing an optical member while taking account of that rotational symmetry, optical properties of the optical member produced from the synthetic quartz glass can be improved.

While the present invention has been described in detail and with reference to specific embodiments thereof, it will be apparent to one skilled in the art that various changes and modifications can be made therein without departing from the spirit and scope thereof.

This application is based on Japanese Patent Application Nos. 2005-042516 and 2005-363768, the contents thereof being herein incorporated by reference.

The invention claimed is:

1. A process for producing a synthetic quartz glass, which comprises:
    depositing and growing fine quartz glass particles synthesized by flame hydrolysis of a glass-forming material on a rotating target to thereby form a porous quartz glass base of a substantially cylindrical shape;
    presintering the porous quartz glass base;
    placing the porous quartz glass base such that the porous quartz glass base has a growth axis of the substantially cylindrical shape in a vertical direction; and
    imposing a load on the porous quartz glass base in the vertical direction such that the load is sufficient to cause the porous quartz glass base undergo uniform axial volumetric contraction while heating the porous quartz glass base to a temperature not lower than a vitrification temperature to convert the porous quartz glass base into a transparent glass.

2. The process for producing a synthetic quartz glass of claim 1, wherein the load imposed is 0.4 to 20.0 g/cm$^2$.

* * * * *